(12) United States Patent
Luk et al.

(10) Patent No.: US 6,175,553 B1
(45) Date of Patent: Jan. 16, 2001

(54) METHOD AND APPARATUS FOR LOCATING AND ISOLATING A FAULT WITHIN A TOKEN RING NETWORK

(75) Inventors: Wilson C. W. Luk, San Francisco; Keith S. Fischer, Sunnyvale; Kenrick M. Kutzler, San Jose, all of CA (US)

(73) Assignee: Nortel Networks Corporation, Montreal (CA)

( * ) Notice: Under 35 U.S.C. 154(b), the term of this patent shall be extended for 0 days.

(21) Appl. No.: 08/879,732

(22) Filed: Jun. 20, 1997

(51) Int. Cl.$^7$ ........................................... H04J 3/14
(52) U.S. Cl. ............................................ 370/222; 370/245
(58) Field of Search .................................. 370/216, 221, 370/222, 241, 242, 243, 244, 245, 223, 224, 248

(56) References Cited

U.S. PATENT DOCUMENTS

| | | | |
|---|---|---|---|
| 5,283,783 | * | 2/1994 | Nguyen et al. ........................ 370/222 |
| 5,361,250 | * | 11/1994 | Nguyen et al. ........................ 370/222 |
| 5,363,366 | * | 11/1994 | Wisdom et al. ....................... 370/245 |
| 5,508,998 | * | 4/1996 | Sha et al. ............................. 370/222 |
| 5,539,727 | | 7/1996 | Kramarczyk et al. ................ 370/16.1 |
| 5,600,657 | | 2/1997 | Orita .................................... 371/20.6 |
| 5,602,827 | * | 2/1997 | Lindeborg et al. ................... 370/223 |
| 5,649,100 | | 7/1997 | Ertel et al. ......................... 395/200.1 |
| 5,703,872 | | 12/1997 | Boggs et al. ......................... 370/252 |

\* cited by examiner

*Primary Examiner*—Ajit Patel
*Assistant Examiner*—Brian Nguyen
(74) *Attorney, Agent, or Firm*—Blakely Sokoloff Taylor & Zafman LLP

(57) ABSTRACT

A method and an apparatus for isolating a communication fault within a token ring network are described. The token ring network includes a number of stations, each of which is configured to generate or repeat beaconing data indicating a network communication fault. The method requires firstly isolating each station of the token ring network in a closed-loop station ring. A location in each of these isolated station rings is then monitored for the transmission of beaconing data indicating a communication fault within the respective station ring. If the transmission of such beaconing data is not detected, the station is reconnected to the token ring network. On the other hand, should the transmission of such beaconing data be detected, the station is maintained within the closed-loop station ring. In this way, faulty stations are isolated from the token ring network.

18 Claims, 12 Drawing Sheets

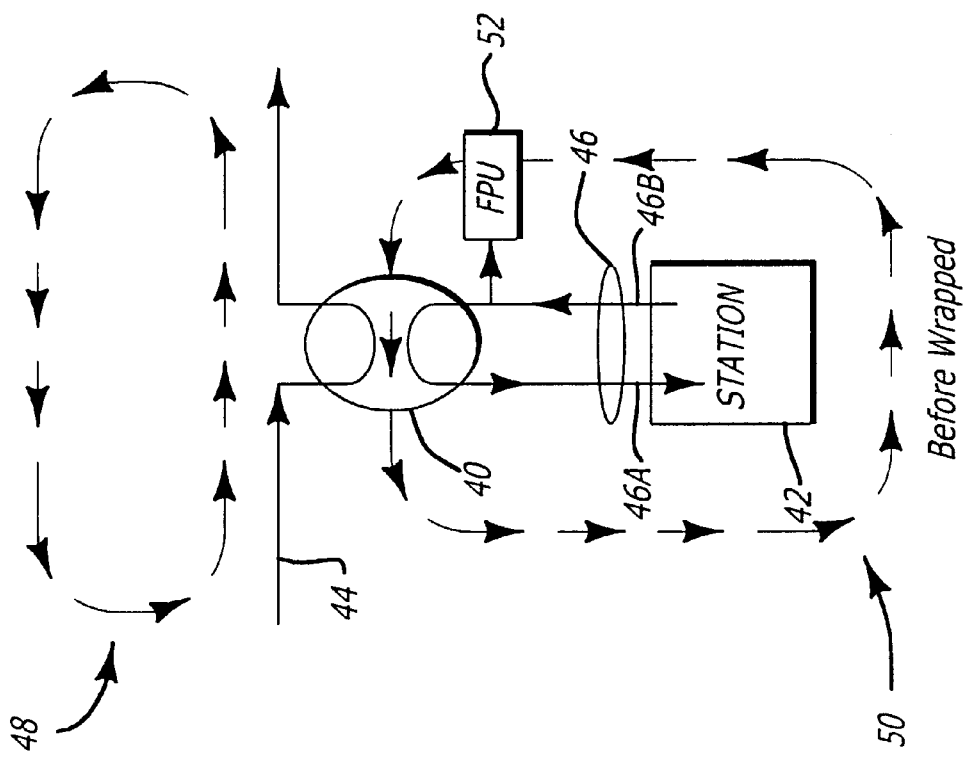
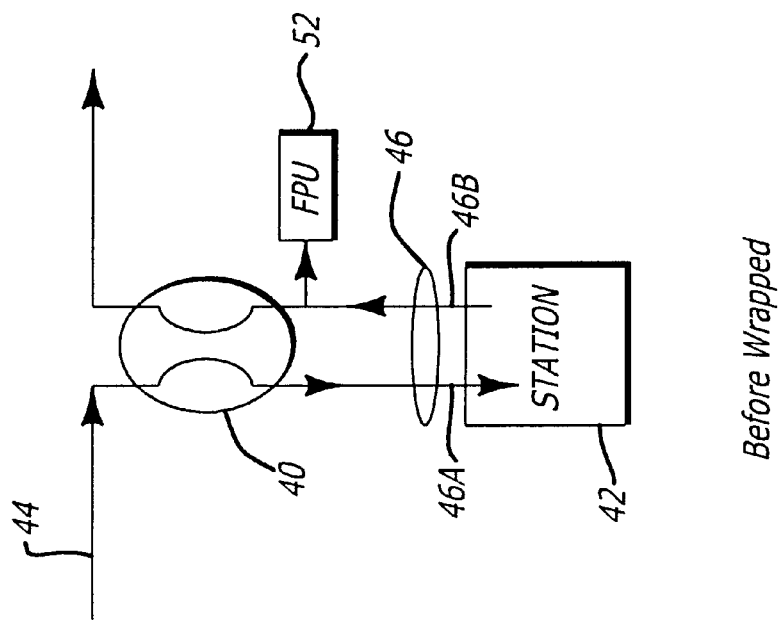
FIG. 3

METHOD AND APPARATUS FOR LOCATING AND ISOLATING A FAULT WITHIN A TOKEN RING NETWORK

FIELD OF THE INVENTION

The present invention relates generally to the field of communications networks. Specifically, the present invention relates to the location and isolation of communications faults within a token ring network.

BACKGROUND OF THE INVENTION

Token-ring networks conform to the IEEE 802.5 standard, and include a number of stations (or nodes) connected in a closed-loop ring network, within which a token is circulated from station to station. For a station to communicate over the ring network, it must have priority to the token, and will accordingly take the token from the ring when it is available, and transmit a signal indicating that the token has been taken. At this point, no other station may communicate over the network, and the token-holding station (i.e. the source station) transmits a data frame to a destination station. The data frame will be propagated in one direction, and from station to station, around the ring network until received by the destination station, which copies the data frame into internal storage, and forwards the message on. Once the source station again receives the data frame that it generated, it releases the token for use by other stations.

Each station within a token ring network thus acts as a repeater for token and message data frames. When a new station is added to the ring network, it undergoes an initialization sequence to become part of the ring network. It will be appreciated that it is crucial to proper functioning of the ring network that the closed-loop ring network be maintained at all times, and that all stations and cabling be functioning properly. The failure of a single station or its connections can cause the entire ring network to be rendered inoperative.

The integrity of a ring network is particularly vulnerable during the addition and removal of stations and other devices. For example, the insertion into a token ring network of a station that violates the IEEE 802.5 protocol, or that has a broken receive/transmit cable, can render the whole token ring network inoperative.

A number of methods of locating and isolating faults within token ring networks have been proposed. These methods range from manually locating and replacing faulty stations or cables, to more sophisticated methods involving a network probe and isolation circuitry. Examples of such sophisticated techniques are described in U.S. Pat. Nos. 5,283,783 and 5,361,250, both entitled "Apparatus and Method of Token Ring Beacon Removal for a Communication Network", and U.S. Pat. No. 5,508,998, entitled "Remote Token Ring Beacon Station Detection and Removal". While the methods and apparatus described in these references are effective to located and isolate faults within a token ring network, they require that the network become inoperative while the location and isolation process is occurring. The time required to perform these methods is also often unacceptably long.

SUMMARY OF THE INVENTION

According to a first aspect of the invention, there is provided a method of isolating a communication fault within a token ring network. The token ring network includes a number of stations, each of which is able to generate or repeat beaconing data to indicate a communication fault. The method requires isolating each station from the token ring network in a closed-loop station ring. Each station ring is then monitored to determine whether a communication fault exists within the relevant station ring. If such a communications fault does not exist within the station ring, the relevant station is reconnected to the token ring. Alternatively, should a communication fault exist within the station ring, the closed-loop station ring is maintained so that the station remains isolated from the token ring network. By performing the above sequence with respect to each station included in a token ring network, unhealthy or faulty stations can be excluded and isolated from the token ring network.

According to a second aspect of the invention, there is provided apparatus for isolating a communication fault within a token ring network. The apparatus includes a number of isolators, each of which is selectively able to isolate a station from the token ring network and to connect the station in a ring topology to the token ring network. The apparatus also includes a number of detectors, each of which is able to detect a communication fault within an isolated station ring. Each detector is associated with an isolator, and operates the associated isolator to either connect the station to the token ring, or maintain it within an isolated station ring, depending on whether a communication fault is detected within a relevant station ring.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 3 is a schematic illustration showing the wrapping of a port, according to the present invention, to form an isolated and closed-loop station ring.

DETAILED DESCRIPTION

Methods and apparatus for locating and isolating a fault within a token ring network are described. In the following description, for purposes of explanation, numerous specific details are set forth in order to provide a thorough understanding of the present invention. It will be evident, however, to one skilled in the art that the present invention may be practiced without these specific details.

Token Ring Network Overview

Figure 1:
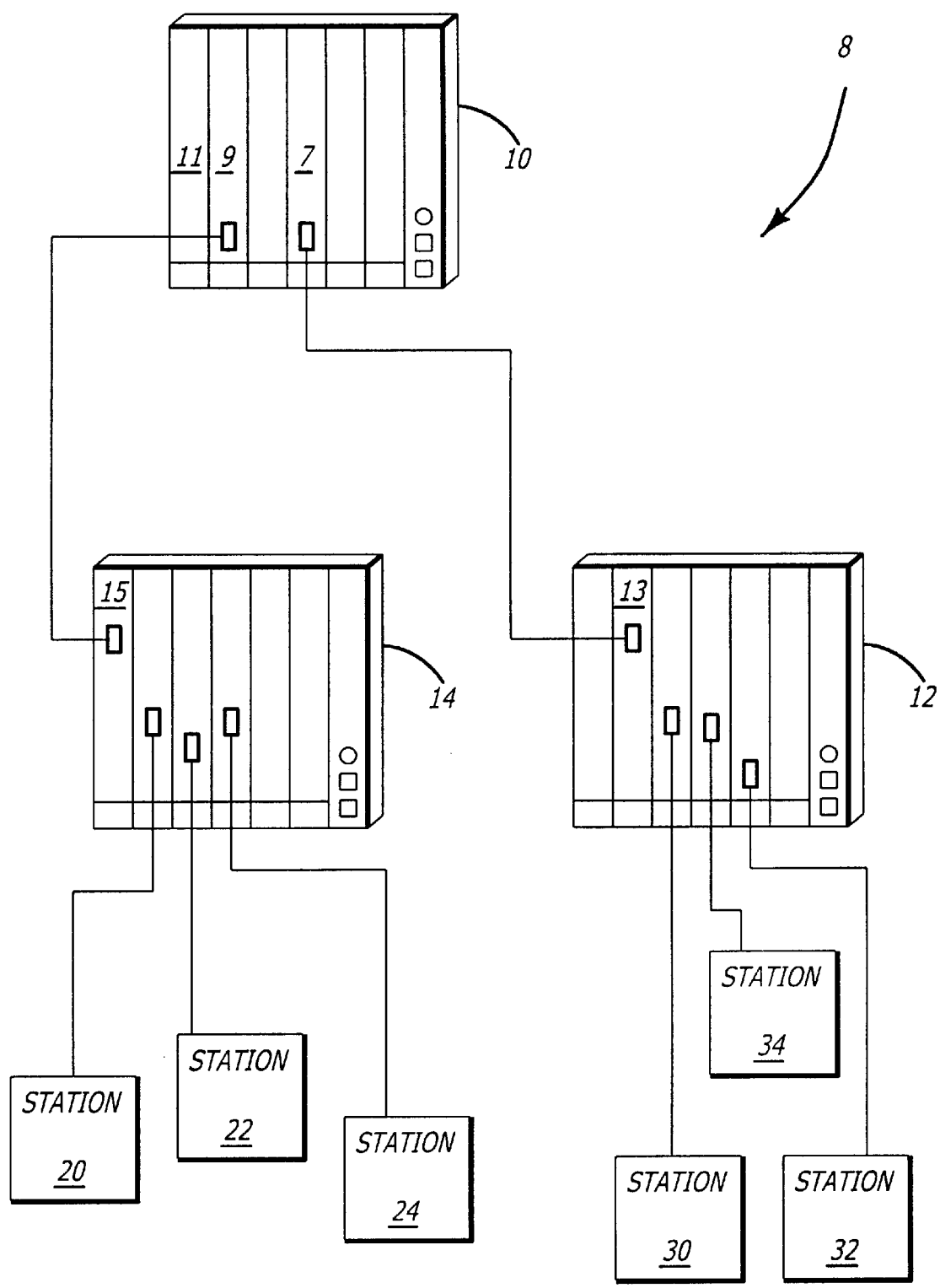
FIG. 1 is a schematic illustration of a token ring network within which the present invention may be implemented.
Figure 2:
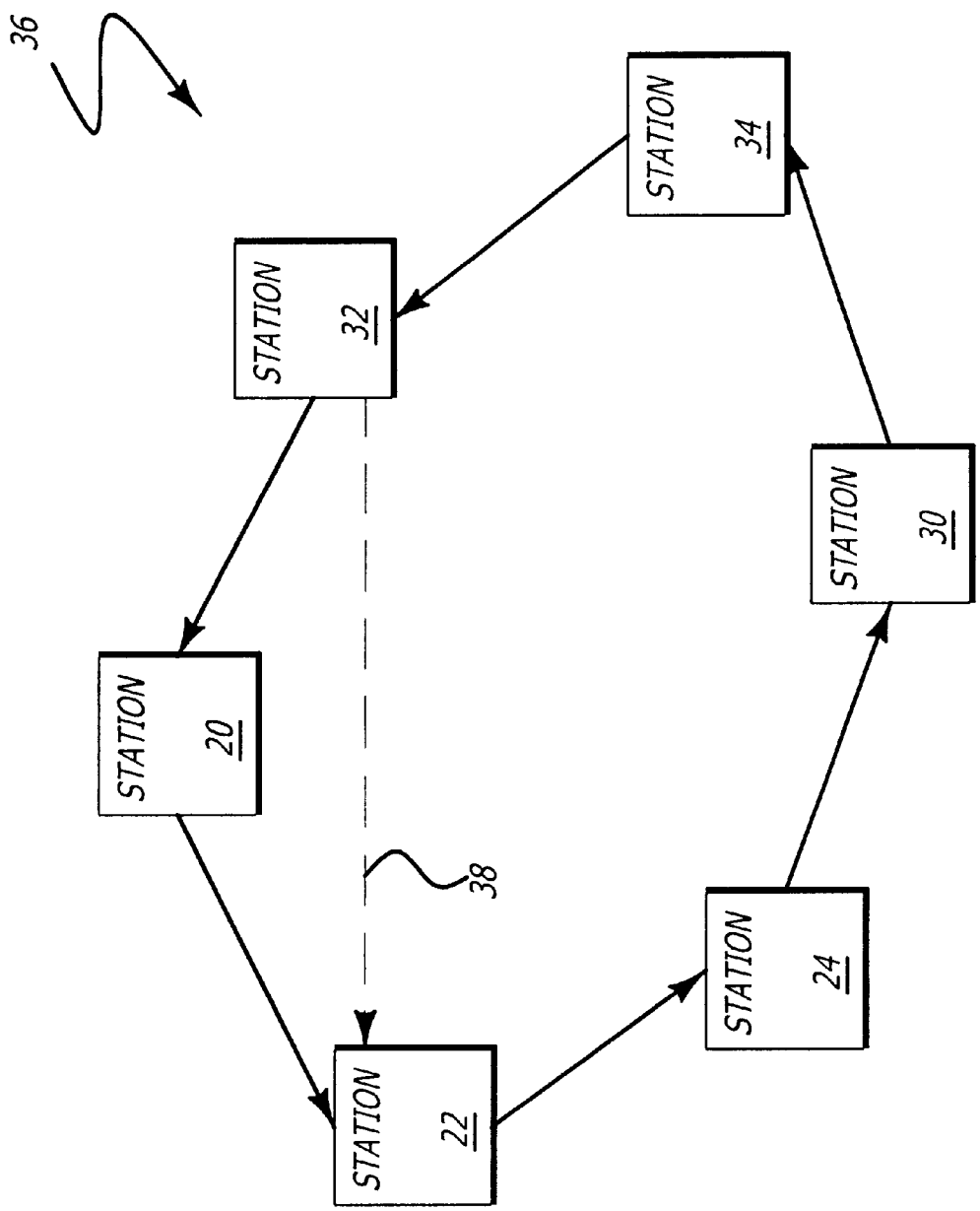
FIG. 2 is a schematic representation of a number of stations connected in a ring topology.

Referring to FIG. 1, there is illustrated an exemplary token ring network 8 within which the present invention may be implemented. The network 8 includes three concentrators (also termed Multistation Access Units (MAUs)) 10, 12 and 14 which are coupled together by shielded cabling. Each concentrator 10, 12 and 14 contains a "collapsed ring" or backplane to which stations can be connected via ports, and to which other concentrators can be connected via Ring In/Ring Out (RI/RO) units. To this end, each concentrator is shown to include several modules, which are separated by vertical lines. Each module may include a number of ports and/or RI/RO units by which stations and other concentrators can be included within the token ring network 8. Each concentrator 10, 12 and 14 also includes a Network Management Module (NMM) 11, 13 and 15 respectively, which provides local intelligence to the concentrator, and which is responsible for network communication control and signaling with the concentrator itself, and also with respect to other concentrators. The NMM 15 of concentrator 14 is coupled to a RI/RO unit of module 9 of concentrator 10, while NMM 13 of concentrator 12 is coupled to a RI/RO unit of module 7 of concentrator 10. The token ring network 8 also includes a number of stations 20, 22, 24, 30, 32, 34, which are coupled to concentrators 12 and 14 at respective ports of modules included within these concentrators. The stations are thus logically connected in a ring 36, as depicted in FIG. 2. Token, data and control frames circulate within the ring 36 in the direction indicated by the arrows between each of the stations. Any one of the stations within the ring 36 may be designated as the so-called "Active Monitor", which controls several communications aspects of the token ring network 8, including maintaining and updating the token and eliminating data frames that have traversed the network 8 more than once.

Wrapping

When a fault arises within a token ring network, the network is kept functional by identifying the fault, and then isolating the fault from the remainder of the network by effectively "short-circuiting" the ring network so that the fault no longer comprises part of the network and so that the logical ring between healthy stations is maintained. Referring to FIG. 2, assuming that station 20 is identified as being faulty, ring 36 operability can be restored by establishing a communication path 38 between stations 32 and 22, so that station 20 is isolated or "wrapped". Wrapping may be performed by the NMM of a concentrator, and may involve simply short-circuitry or bypassing the port to which the faulty station is coupled.

FIG. 3 provides a more detailed illustration of the how, according to the invention, a port 40, by which a station 42 is connected to the backplane 44 of a concentrator, is wrapped. The station 42 is coupled to the port 40 by a transmit/receive cable 46. The cable 46 comprises a receive line 46A, which is coupled to the input of the station 46 and by which the station receives frames from the backplane 44, and a transmit line 46B, which is coupled to the output of the station 46 and by which the station transmits frames to the backplane 44. As illustrated, after the port has been wrapped, two separate closed-loop paths are defined, namely the closed-loop path 48 of the token ring network and the closed-loop path 50 of the isolated ring attached to the station 42 (i.e. the station ring). Also shown coupled to the transmit line 46B is a Frame Processing Unit (FPU) which is associated with the port 40 and station 42, and whose purpose and functioning will be described below. It is significant that the FPU 52 is included within the closed-loop path 50 defined by the station ring.

Beaconing

Before wrapping a faulty station or port within a token ring network, it is desirable that the location of the fault be determine quickly and accurately so as to cause minimum network downtime. The present specification proposes two methods of locating faults within a token network using beaconing data. The two methods are performed sequentially, if necessary, as will be described below. The present specification also proposes the use of a beacon Frame Processing Unit (FPU) 52 in conjunction with the above beaconing frame to locate a fault within a network.

Figure 4:
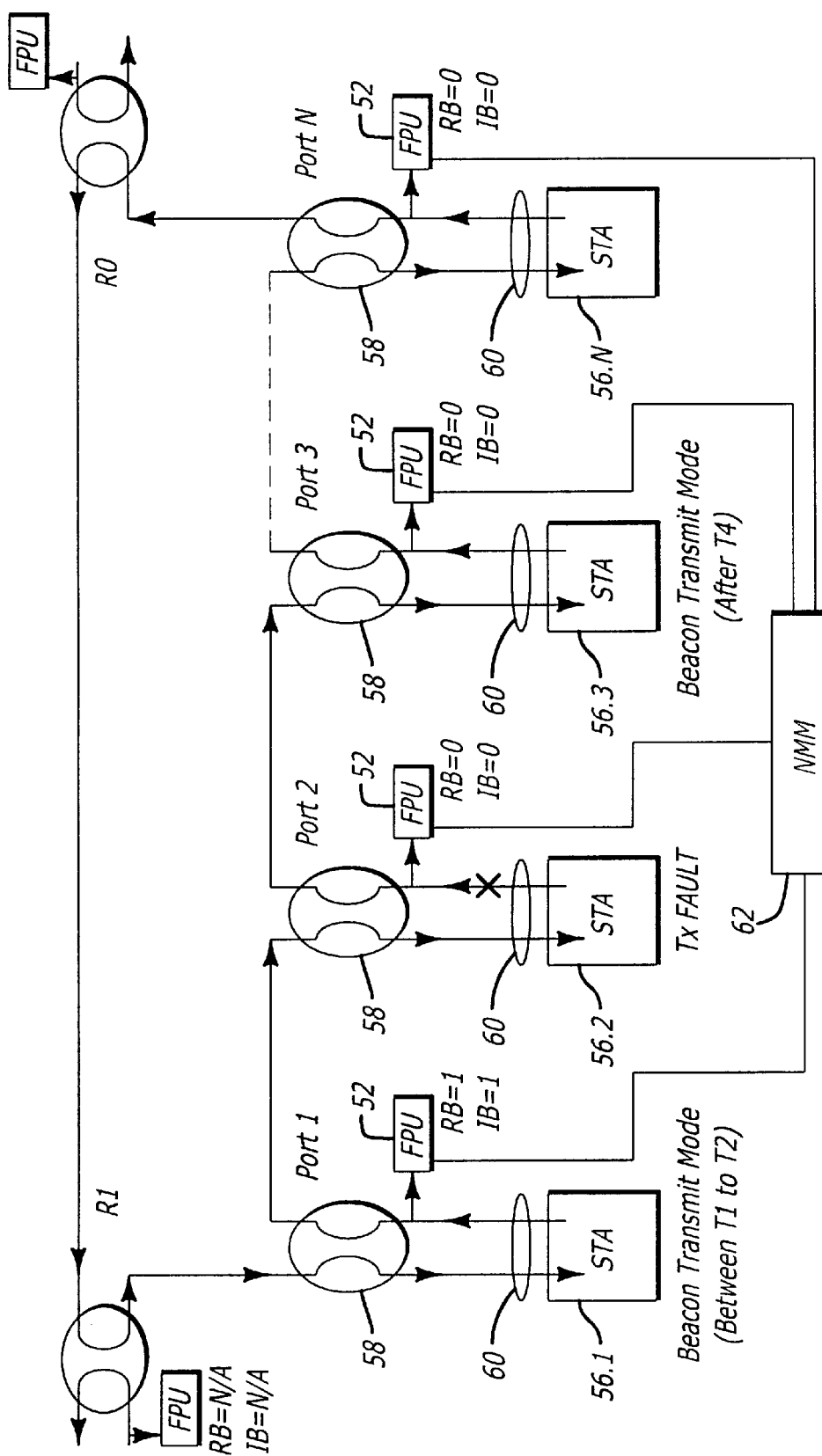
FIG. 4 is a schematic illustration of a token ring network according to one embodiment of the present invention, wherein a fault exists on the transmit line of a station.

FIG. 4 shows a token ring network 54 according to one embodiment of the invention, the network 54 including N stations 56.1-56.N coupled to respective ports 58 by transmit/receive cables 60. Each of the ports 58 includes an isolator in the form of either an electronic or electromechanical switch by which an associated station 56 and transmit/receive cable 60 can be wrapped, as described above with reference to FIG. 3, to create an isolated station ring.

The generation and propagation of beaconing frames upon the occurrence of a fault within the network will now be described. For the purposes of illustration assume that station 56.1 is functioning as the Active Monitor within the network 54, and that a fault has occurred on the transmit line of the cable 60 of station 56.2, as indicated by the cross in FIG. 4. As station 56.1 is the Active Monitor, it will realize after a predetermined time-out period that no tokens, data frames or control frames have been received by it as a result of a fault somewhere in the network. The station 56.1 then begins beaconing by entering a Beacon Transmit Mode, and transmitting beacon frames. Upon receipt of a beacon frame, stations downstream of the beaconing station enter a Beacon Repeat Mode, in which they repeat all beacon frames received. Thus initially, in the present example, station 56.1 will be in the Beacon Transmit Mode and station 56.2 will be in the Beacon Repeat Mode. However, in view of the location of the fault, none of the station 56.3-56.N downstream of station 56.2 will be beaconing as they will not receive a beaconing frame from the Active Monitor. After a further predetermine time-out period (longer than the time-out period utilized by the Active Monitor) of not receiving any network traffic, station 56.3 will realize that a fault has occurred, and then enter the Beacon Transmit Mode, and all stations downstream of station 56.3 (including the Active Monitor) will enter the Beacon Repeat Mode. This stable situation will then persist until the fault is removed from the network. A beacon frame includes both an address of the beaconing station, and an address of the immediately upstream station from the beaconing station (i.e. an Upstream Neighbor Address (UNA)). In response to the occurrence of beacon frames on the network, a procedure is initiated, according to the invention, which allows the location of the fault to be determined in an expeditious manner.

Frame Processing Unit (FPU)

FIG. 4 also shows a detector in the form of a FPU 52 coupled to the transmit line of each of the cables 60. Each FPU 52 allows localized monitoring to be performed with respect to each station and port, and thus provides a high resolution view of the state of the various portions of the entire network Each FPU 52 is further upstream of an isolation switch (or isolator) within an associated port 58, and functions to collect status information regarding an associated, immediately upstream station 56, regardless of whether the associated port 58 is wrapped or unwrapped by an isolator switch to create a station ring. Specifically, each FPU 56 includes registers containing a number of bits which can be set to a logical 0 or a logical 1 to provide information concerning the status of a station. The FPU 56 maintains, inter alia, the following bits:

1. a "Ring Beaconing" (RB) bit, which is set when a beacon frame is received at an FPU 52, regardless of the origin of the beacon frame;
2. an "I'm Beaconing" (IB) bit, which is set on receipt of a beacon frame generated by an associated station (e.g. an immediately upstream station) operating in the Beacon Transmit Mode;
3. a UNA interrupt bit; and
4. a UNA available status bit.

So as to allow an FPU 52 to determine whether a beacon frame was generated by an associated station operating in the Beacon Transmit Mode, the FPU 52 maintains a record of the Upstream Neighbor Address (UNA), which is the MAC address of the immediately upstream station. By examining the address of the transmitting station included within a beacon frame, an FPU 52 is able to determine whether the IB bit should be set or not.

Referring again to FIG. 4, the state of the RB and IB bits maintained by the various FPUs 52 is shown immediately after the station 56.1, as the Active Monitor, begins beaconing. Specifically, the FPU 52 associated with station 56.1 sets both the IB and RB bits to 1. In view of the location of the fault, none of the downstream FPUs 52 receive a beacon frame generated by the station 56.1, and accordingly the RB and IB bits of these FPUs 52 are set to 0.

Figure 5:
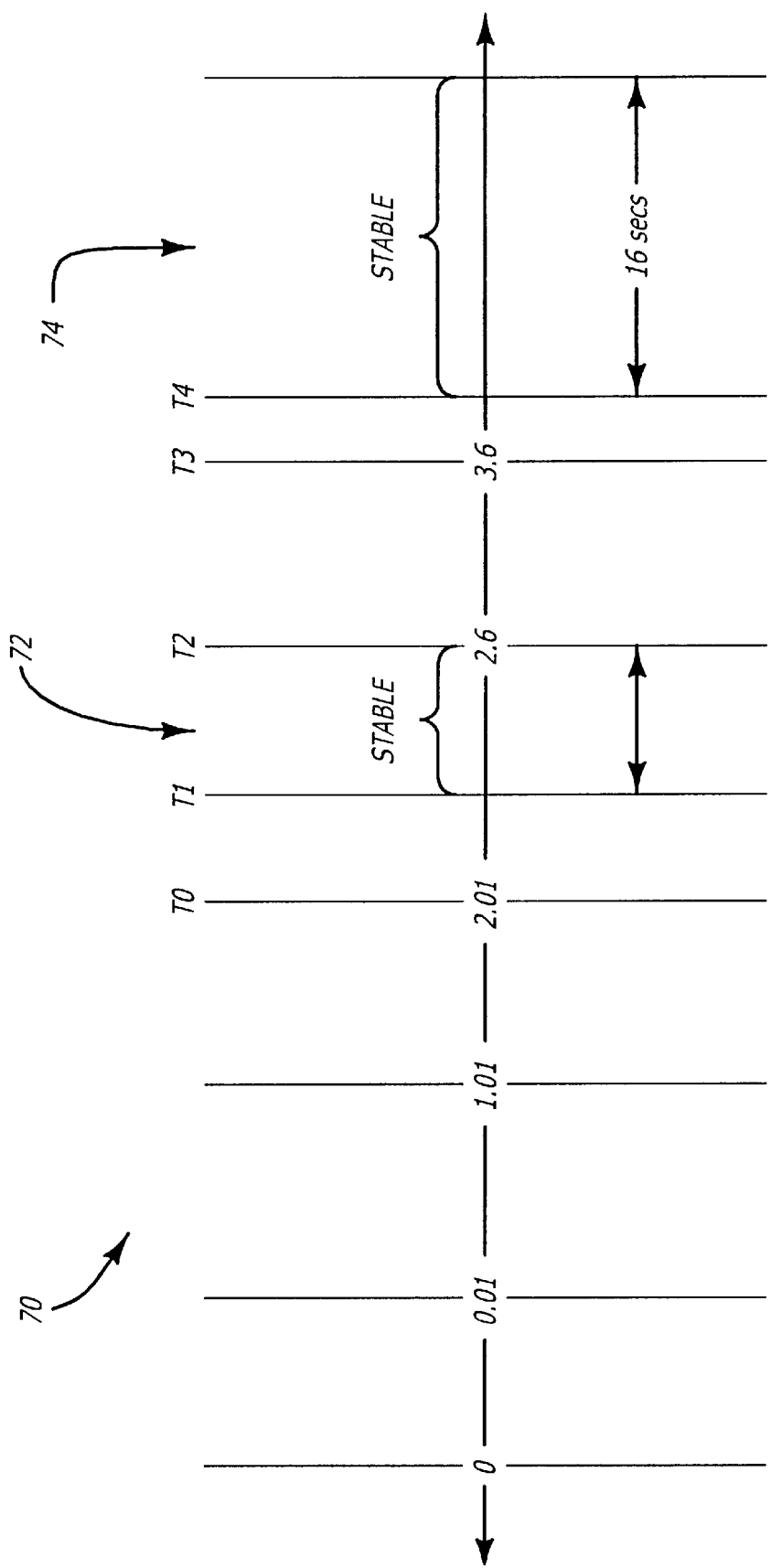
FIG. 5 is a timing diagram showing the progress of time after the detection of a network fault within the token ring network shown in FIG. 4.

As discussed above, the station 56.3 will enter the Beacon Transmit Mode after a predetermined time-out, in which case the settings of the various RB and IB bits will change. Reference is made to FIG. 5, which shows a timing diagram 70 representing the progress of time after the detection of a network fault by the Active Monitor station 56.1. At time T0, the Active Monitor starts transmitting beacon frames in response to the detection of the fault. At time T1, most stations are in Beacon Repeat Mode. At time T2, the downstream neighbor of the faulty station (i.e. station 56.3) starts claiming tokens. Specifically, the station 56.3 assumes that the Active Monitor is not functioning properly, and will begin transmitting claim token MAC frames in an attempt to establish a new Active Monitor. This initiates a "Monitor Contention Process", which persists for a specific monitor contention time period. On expiration of the monitor contention time period, and if no Active Monitor is established, the ring enters a so-called "Beacon Process". At time T3, the station 56.3 enters the Beacon Transmit Mode, and starts transmitting beacons, and at time T4, most stations are again in the Beacon Repeat Mode. The time period 72 between T1 and T2, and the time period 74 after T4, are stable, and it is during these time periods that the states of the RB and IB bits are examined.

The three tables below set out the status of the RB and IB bits as time progresses after T1.

TABLE 1

T1 to T2

|    | FPU1 | FPU2 | FPU3 | ... | FPUN |
|----|------|------|------|-----|------|
| IB | 1    | 0    | 0    | ... | 0    |
| RB | 1    | 0    | 0    | ... | 0    |

TABLE 2

T2 to T4

|    | FPU1 | FPU2 | FPU3 | ... | FPUN |
|----|------|------|------|-----|------|
| IB | 0    | 0    | 0    | ... | 0    |
| RB | 0    | 0    | 0    | ... | 1    |

TABLE 3

T4 onwards

|    | FPU1 | FPU2 | FPU3 | ... | FPUN |
|----|------|------|------|-----|------|
| IB | 0    | 0    | 1    | ... | 0    |
| RB | 1    | 0    | 1    | ... | 1    |

Each FPU 52 is also coupled to a fault identifier, which may comprises a NMM 62 or any other processor. The NMM 62 is capable of ascertaining the state of the RB and IB bits in each FPU 52 and, based on the states of the RB and IB bits, to obtain global overview of the status of the network 54 and to identify the location of a fault within the network 54. Accordingly, the NMM 62 is provided with a localized and high-resolution monitoring capability by the FPUs 52, and has a view of the RB and IB as presented in the above Tables 1–3.

Figure 6:
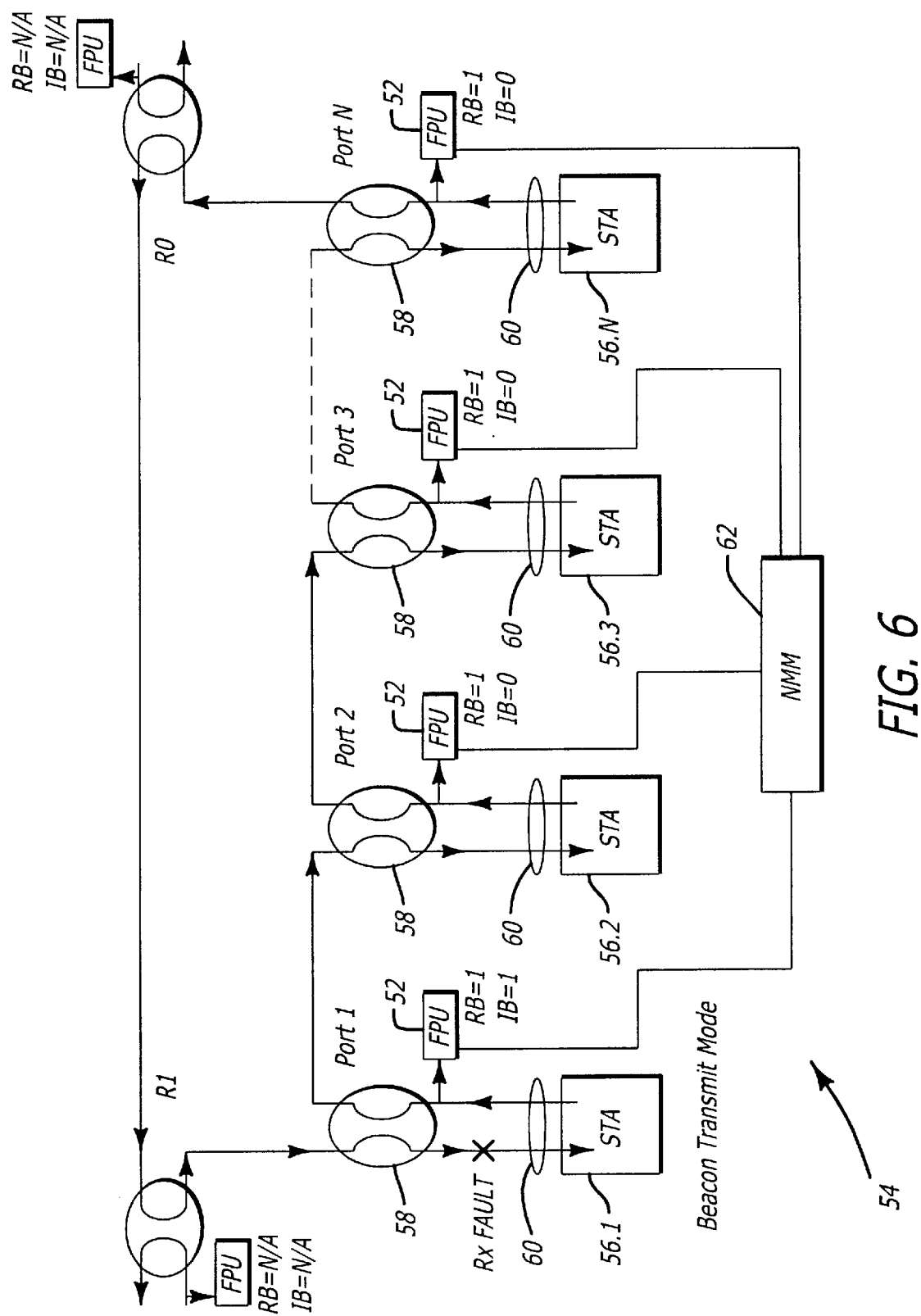
FIG. 6 is a schematic illustration of the token ring network of FIG. 4, wherein a fault is shown to exist on the receive line of a station.

FIG. 6 shows the token ring network 54, with a fault located on the receive line of the cable 60 connecting station 56.1 to the network 54. The status of the RB and IB bits is also shown immediately after station 56.1, as the Active Monitor, begins beaconing. The below tables again show the status of the RB and IB bits as time progresses for T1.

TABLE 4

T1 to T2

|    | FPU1 | FPU2 | FPU3 | ... | FPUN |
|----|------|------|------|-----|------|
| IB | 1    | 0    | 0    | ... | 0    |
| RB | 1    | 1    | 1    | ... | 1    |

TABLE 5

T2 to T4

|    | FPU1 | FPU2 | FPU3 | ... | FPUN |
|----|------|------|------|-----|------|
| IB | 1    | 0    | 0    | ... | 0    |
| RB | 1    | 1    | 1    | ... | 1    |

TABLE 6

T4 onwards

| | FPU1 | FPU2 | FPU3 | ... | FPUN |
|---|---|---|---|---|---|
| IB | 1 | 0 | 0 | ... | 0 |
| RB | 1 | 1 | 1 | ... | 1 |

As is apparent, the status of the RB and IB remains unaltered in view of the fact that the station 56.1 remains in the Beacon Transmit Mode over the entire period.

Beacon Removal Process Overview

The method by which a fault is located utilizing the RB and IB bits, and then isolated from a token ring network, will now described.

Figure 7:
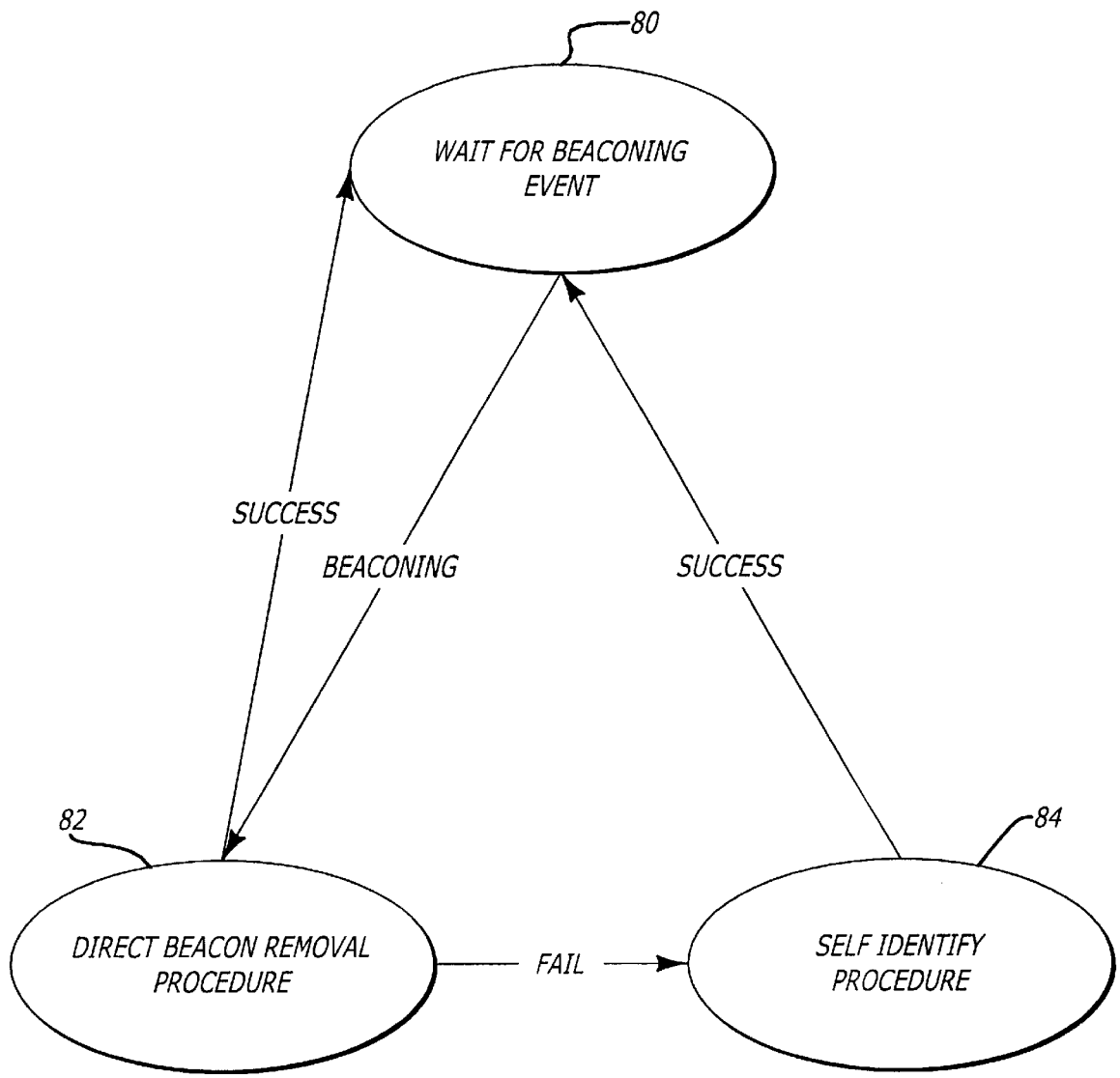
FIG. 7 is a state diagram illustrating the various states occupied by a token ring network during a beacon removal process according to the invention.

FIG. 7 is a state diagram showing a beacon removal process according to the invention. A token ring network will operate in state 80, until beaconing in commence on the network, at which time a Direct Beacon Removal Procedure 82 is initiated. If the procedure 82 is successful and the fault is isolated, the network returns to waiting for a further beaconing event. However, should the procedure 82 fail, a Self-Identify Procedure 84 is initiated which will isolated the fault, whereafter the network again returns to waiting for a further beaconing event. As will be appreciated from the following description, the procedures 82 and 84 are independent, and capable of use independently, or sequentially as illustrated in FIG. 7.

Direct Beacon Removal Procedure

Figure 8:
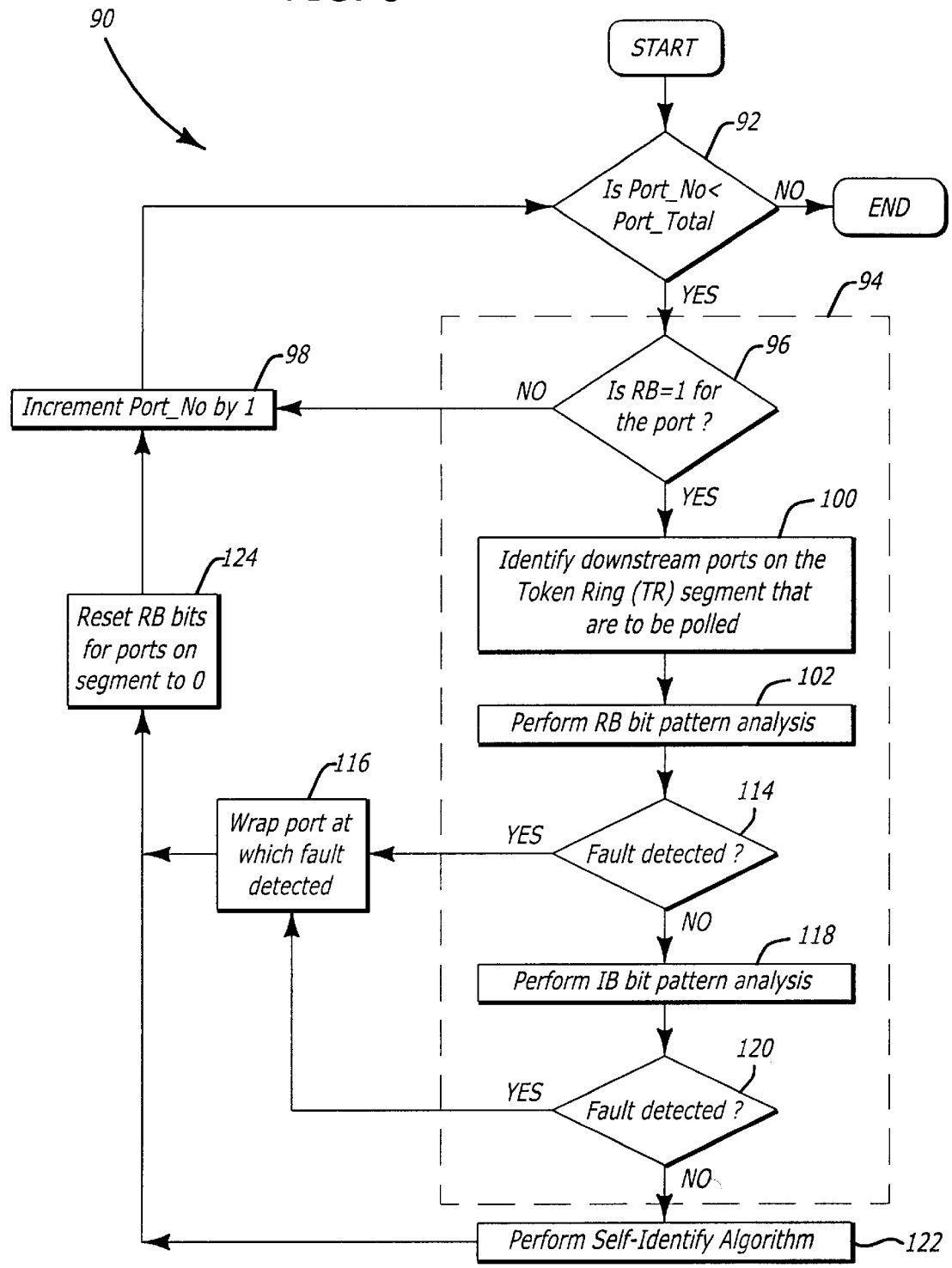
FIG. 8 is a flow chart illustrating a method, according to one embodiment of the invention, of locating and isolating a fault within a token ring network.

A method of beacon removal will be described with reference to FIGS. 4, and 8–12. FIG. 8 is a flowchart illustrating a method 90, according to one embodiment of the present invention, of locating and isolating a fault within a token ring network. The method 90 is performed by the NMM 62, and comprises a cyclic check of the status of the RB and IB bits maintained by each FPU 52 associated with a port 58 and station 56 of a token ring network 54. The method 90 is commenced by the NMM 62 of a network in response to the detection of a beaconing frame on the network 54. Prior to commencing the method 90, the NMM 62 sets a variable (Port_No), which is maintained within a register in the NMM 62 and which indicates the number of a port under scrutiny by the method 90, to 0. The method 90 then commences at decision box 92 by determining whether the number of the port (Port_No) under scrutiny is less than the total number of ports (Port_Total). If not, this indicates that the beacon removal algorithm has been performed with respect to all ports of the network, and the method 90 is terminated by the NMM 62. Alternatively, should the number of the port be less that the total number of ports, it is apparent that not all ports have be scrutinized, and the NMM 62 proceeds to initiate the Direct Beacon Removal Procedure 94. At decision box 96, it is determined whether the RB bit, for the port identified by the variable Port_No, is set to one (1). If not, this indicates that the port is downstream of the fault, as it has not received a beacon frame, and the variable Port_No is incremented by 1 at step 98, whereafter the method 90 returns to decision box 92. Alternatively, should the RB bit for the port under consideration be set to one (1), a network analysis segment, which comprises all unexamined ports downstream of the port under consideration, is identified at step 100. At step 102, a RB bit pattern analysis is performed.

Figure 9:
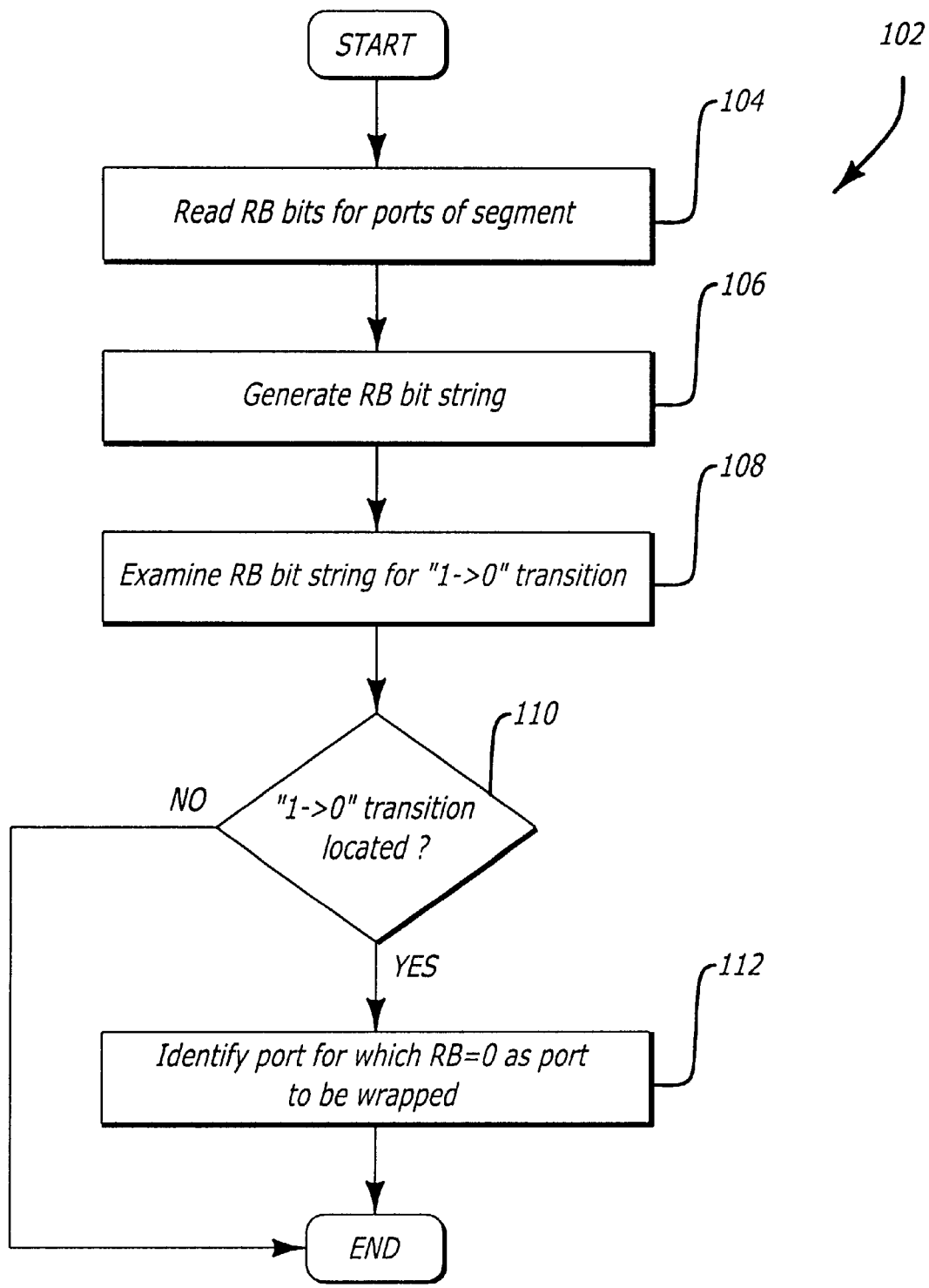
FIG. 9 is a flow chart illustrating the steps comprising a RB bit pattern analysis according to the present invention.

FIG. 9 is a flowchart illustrating the steps comprising the RB bit pattern analysis step 102. At step 104, the RB bits for all ports of the network analysis segment are read by the NMM 62. At step 106, the NMM 62 identifies a RB bit string comprising the current states of the RB bits. At step 108, the NMM 62 examines the RB bit string for a one (1)-to-zero (0) transition. At decision box 110, if no one-to-zero transition is detected in the bit pattern, the RB bit pattern analysis terminates. However should a one-to-zero transition be detected, this indicates the location of the fault, and the port for which the RB bit is zero (proceeding a one) is identified as being faulty by the NMM 62 at step 112, whereafter the RB bit pattern analysis is terminated. For example, referring to Table 1 above, should the RB bit pattern analysis step 102 have been performed between T1 and T2 (i.e. during a stable period), a RB bit pattern transition would have been identified between the RB bits for ports 56.1 and 56.2. As the RB bit for port 56.2 is set to zero, a transmit fault at station 56.2 is identified. The RB bit pattern analysis identifies ports and stations for which a transmit fault has occurred.

Returning to FIG. 8, having completed the RB bit pattern analysis at step 102, the method 90 proceeds to decision box 114. If a fault was detected, the relevant port is wrapped, as illustrated in FIG. 3, at step 116. Alternatively, should no fault have been detected at step 102, an IB bit pattern analysis is performed at step 118.

Figure 10:
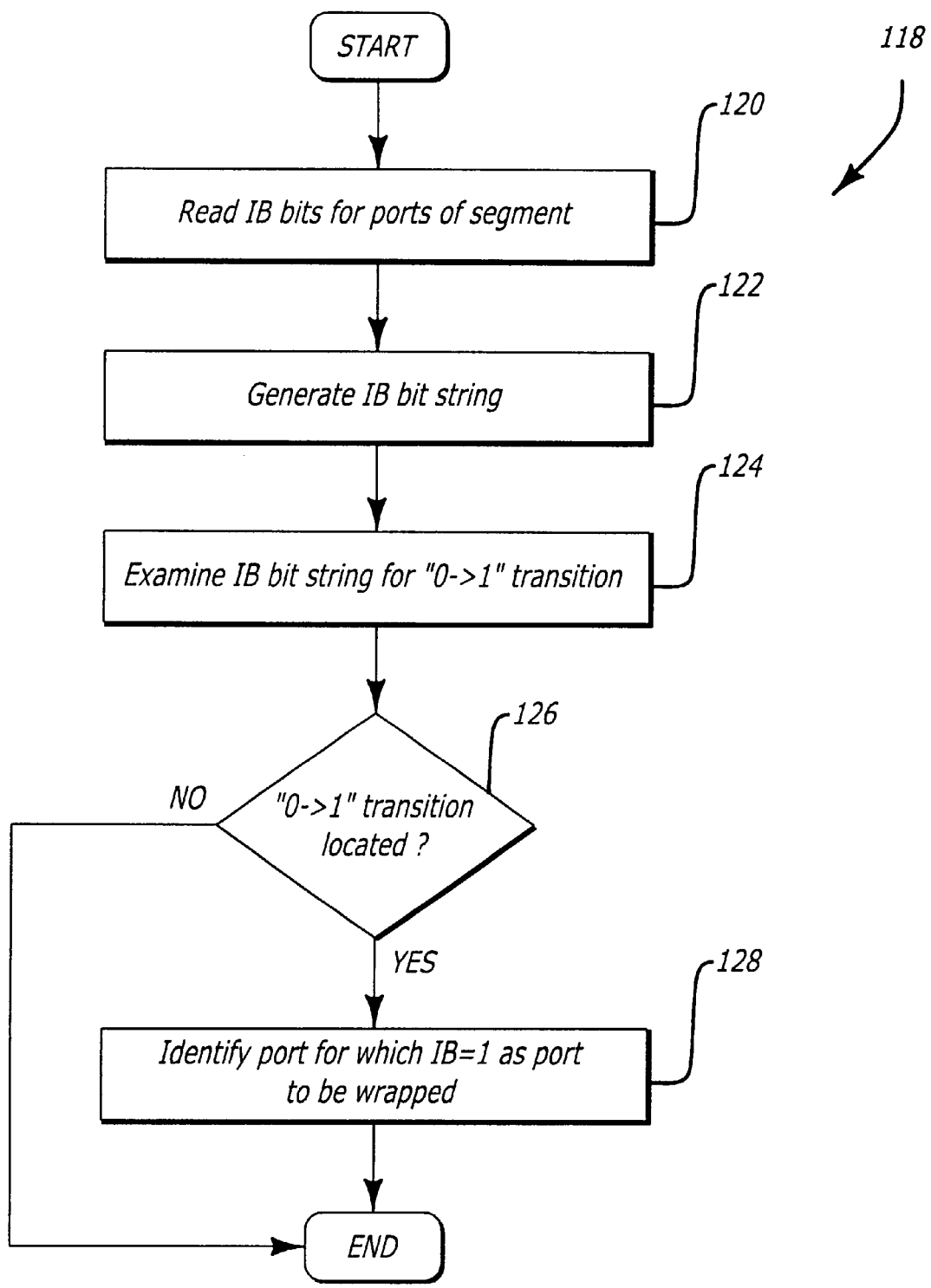
FIG. 10 is a flow chart illustrating the steps comprising an IB bit pattern analysis according to the present invention.

FIG. 10 is a flowchart illustrating the steps comprising the IB bit pattern analysis step 118. At step 120, the IB bits for all ports of the network analysis segment are read by the NMM 62. At step 122, the NMM 62 identifies an IB bit string comprising the current states of the IB bits. At step 124, the NMM 62 examines the IB bit string for a zero (0)-to-one (1) transition. At decision box 126, if no zero-to-one transition in the IB bit pattern is detected, the IB bit pattern analysis terminates. However should a zero-to-one transition be detected, this indicates the location of the fault, and the port for which the IB bit is one (proceeding a zero) is identified as being the faulty by the NMM 62 at step 128, whereafter the IB bit pattern analysis is terminated. For example, referring to FIG. 6 and Table 4 above, should the IB bit pattern analysis step 118 have been performed between T1 and T2, the IB bit pattern transition would have been identified between the IB bits for ports 56.N and 56.1. As the RB bit for port 56.1 is set to one, a receive fault at station 56.1 is identified. The IB bit pattern analysis identifies ports and stations for which a receive fault exists, as opposed to transmit faults which are identified by the RB bit pattern analysis.

Returning again to FIG. 8, having completed the IB bit pattern analysis at step 118, the method 90 proceeds to decision box 120. If a fault was detected, the identified port is wrapped at step 116. Alternatively, should no fault have been detected at step 118, the method 90 proceeds to perform the Self-Identify Algorithm at step 122, which will be described below. After performing either of steps 116 or 122, all RB bits are reset to zero (0) at step 124 before returning to decision box 92.

Self-Identify Algorithm

Figure 11:
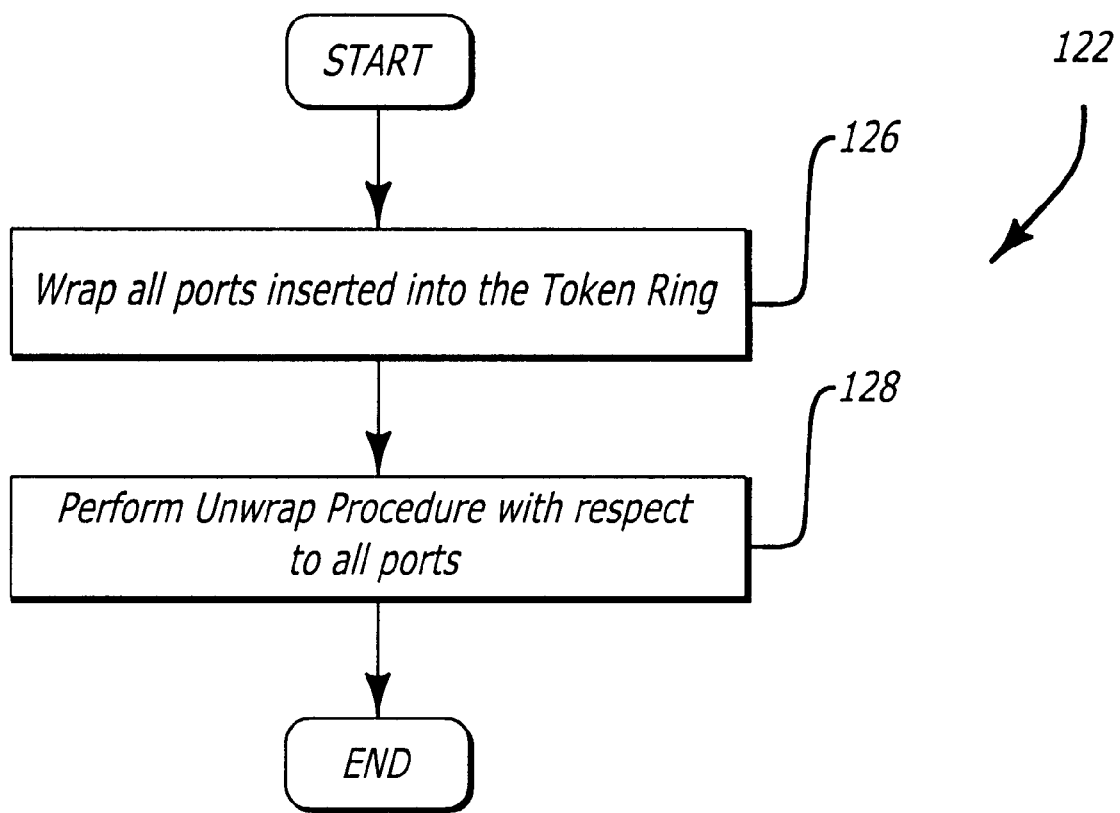
FIG. 11 is a flow chart illustrating the steps of a Self-Identify Algorithm according to the present invention.

FIG. 11 is a flowchart illustrating the basic steps of the Self-Identify Algorithm performed at step 122. Essentially, the Self-Identify Algorithm operates by wrapping all ports, including RI/RO and cascade ports, at step 126, and applying an unwrap procedure to each of these wrapped ports at step 128. At step 126, all ports are wrapped in the manner shown in FIG. 3, so that each station 42, transmit/receive cable 46 and associated FPU 52 are included in a closed-loop station ring. Each station ring can be viewed as a "miniature" token ring network comprising only single station, which is isolated from the remainder of the main token ring network. The beaconing state of the station within each station ring is accordingly determined by whether a fault exists within the isolated station ring. If a station was previously not beaconing and a fault (e.g. at the station, or on either the transmit or receive line 46A or 46B of a cable 46) exists within the closed-loop station ring, the station will then enter the Beacon Transmit Mode and begin beaconing, causing the RB and IB bits of an associated FPU 52 to be set to one (1). Alternatively, should no fault exist with a station ring, the station will cease beaconing, and both the IB and RB bits maintained by the associated FPU 52 will be reset to zero (0). Table 7 below provides further details of how the mode of a station included in an isolated station ring, and the state of the RB bits of an associated FPU, alter after a port has been wrapped:

| Case | Station Mode before Wrapping | Action of Station after Wrapping |
|---|---|---|
| 1 | Beacon Transmit Mode (Healthy Station) | After being wrapped, the station will transmitted a last beacon frame. As it will received its own beacon frame, a ring contention process begins within the isolated station ring. The RB bit will then be reset to zero (0) by a claim token MAC frame, and the port will be unwrapped and the station again included in the token ring. |
| 2 | Beacon Repeat Mode (Healthy Station) | After being wrapped, the station will time-out (e.g. in 200 ms). The station will start the monitor contention process, and begin transmitting claim token MAC frames. The RB bit will be reset to zero (0), and the port will be unwrapped and the station again included in the token ring. |
| 3 | Beacon Transmit Mode (Unhealthy Station) | After being wrapped, the station will continue transmitting beacon frames, but will never receive its own beacon frames in view of the fault in the isolated station ring. The RB bit will remain set to one (1) and the port will not be unwrapped. |
| 4 | Silent Station | Such a station will not be unwrapped and re-admitted to the token ring network until it transmits a non-beacon MAC frame. |

The unwrap procedure performed at step 128 is performed by the NMM 62, and operates on the premise that a fault within an isolated station ring can be detected by an examination of the RB bit maintained by a FPU included within such an isolated station ring. A healthy station has the ability to identify itself as being healthy, and thus to be re-admitted to the token ring network.

Figure 12:
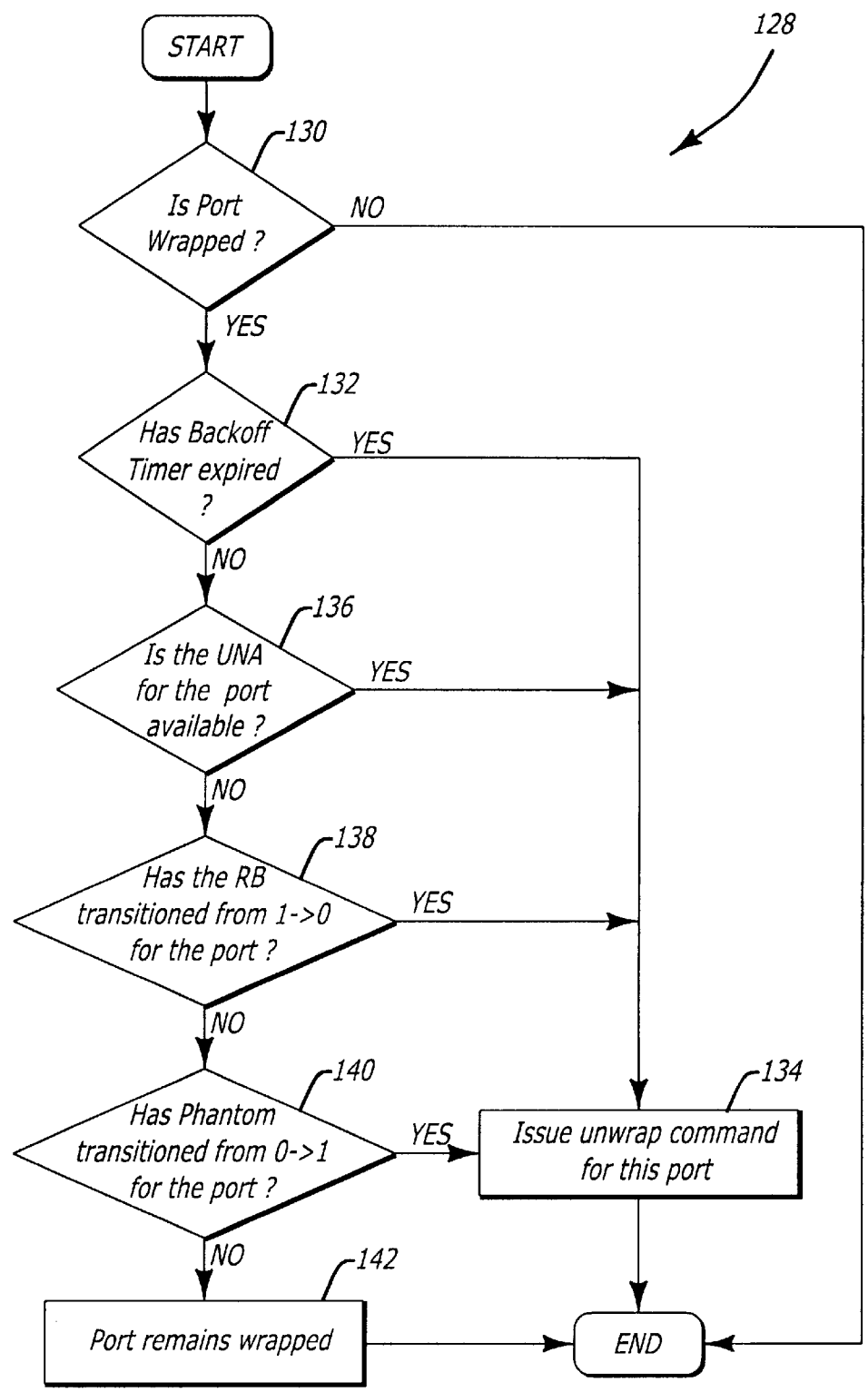
FIG. 12 is a flow chart illustrating a port unwrap procedure according to one embodiment of the present invention.

FIG. 12 is a flowchart illustrating an unwrap procedure, according to one embodiment of the invention, as performed at step 128. The unwrap procedure is performed with respect to each wrapped port, and commences at decision box 130 with a determination of whether a port under consideration is wrapped. If not, the procedure terminates. If so, then a determination is made at decision box 132 whether a backoff timer, with respect to the port, has expired. The backoff time indicates the time expired since the station was isolated from the token ring, and this timer expires after a predetermined period. If so, a port unwrap command is issued at step 134.

If not, a determination is made at decision box 136 whether an UNA is available for the port. If a UNA has been received at this port, this indicates that the station has received a frame at its input that was transmitted from its output, and that data can accordingly again be received from this station. If a UNA is available at the port, a port unwrap command is issued at step 134. If not, a determination is made at decision box 138 whether the RB bit maintained by a FPU included within the closed-loop station ring is set to zero (0) or one (1). If the RB bit is zero (0), then the station ring is assumed to be healthy, and to have cleared the RB bit as described above. At step 134, a port unwrap command is issued by the NMM 62 thereby to re-admit the station to token ring network. If the RB bit is set to one (1), this indicates that a fault may exist within the station ring under consideration. A further determination is then made at decision box 140 whether a "phantom" value for the port is zero (0) or one (1). The phantom value is set by a D.C. voltage sent by an adapter card in the station to indicate to the token ring that a self-diagnostic has been successfully completed. If the phantom value is one (1), a port unwrap command is issued at step 134. Alternatively, the port remains wrapped at step 142 as a result of the fault being present in the station ring. Accordingly, the fault remain isolated from the token ring network.

In alternative embodiments, the present invention may be applicable to implementations of the invention in integrated circuits or chip sets, wireless implementations, switching system products and transmission system products. For the purposes of this application, the terms switching system products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission system products shall be taken to mean products used by service providers to provide interconnection between subscribers and their networks such as loop systems, and which provide multiplexing, aggregation and transport between a service provider's switching systems across the wide area, and associated signaling and support systems and services.

Thus, methods and apparatus for locating and isolating a fault within a token ring network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of isolating a communication fault within a token ring network, the method including:
    isolating a single station from the token ring network in a closed-loop station ring, wherein the single station is coupled to the token ring network by a station receive line to convey data from the token ring network to the single station and by a station transmit line to convey data from the single station to the token ring network, and wherein the single station is isolated so that the closed-loop station ring includes the station receive and transmit lines and the single station, and no further stations, in a closed-loop;
    determining whether a communication fault exists within the closed-loop station ring;

reconnecting the single station to the token ring network if a communication fault does not exist within the closed-loop station ring; and maintaining the closed-loop station ring, isolated from the token ring network, if a communication fault does exist within the closed-loop station ring so as to isolate the single station from token ring network.

2. The method of claim 1 including monitoring the station transmit line for the transmission of beaconing data indicating a communication fault within the closed-loop station ring.

3. The method of claim 2 wherein the monitoring comprises maintaining an indication of the transmission or non-transmission of beaconing data within the closed-loop station ring.

4. The method of claim 1 wherein the single station is configured to generate beaconing data indicating a communication fault, and wherein the determining comprises monitoring a location within the closed-loop station ring for the transmission of beaconing data indicating a communication fault within the closed-loop station ring.

5. The method of claim 1 wherein the token ring network comprises a plurality of stations, and the method includes:

isolating each of the stations from the token ring network in a respective closed-loop station ring;

monitoring each closed-loop station rings to determine whether a communication fault exists within each of the respective closed-loop station ring; and reconnecting each station to the token ring network if a communication fault does not exist within the respective closed-loop station ring.

6. The method of claim 1 wherein the determining comprises determining whether the single station, when isolated from the token ring network within the closed-loop station ring, receives at its input beaconing data propagated from its output.

7. The method of claim 1 wherein the determining comprises determining whether a predetermined time period has expired since isolation of the single station from the token ring in the closed-loop station ring.

8. Apparatus for isolating a communication fault within a token ring network, the apparatus comprising:

an isolator adapted selectively to isolate a single station from the token ring network in a closed-loop station ring and to connect the single station in a ring topology to the token ring network, wherein the single station is coupled to the token ring network by a station receive line to convey data from the token ring network to the single station and by a station transmit line to convey data from the single station to the token ring network, the isolator being configured to isolate the single station so that the station ring includes the station receive and transmit lines and the single station, and no further stations, in a closed loop; and a detector configured to detect a communication fault within the closed-loop station ring when the single station is isolated from the token ring network, and to operate the isolator to connect the single station to the token ring if a communication fault is not detected within the closed-loop station ring.

9. The apparatus of claim 8 wherein the detector is configured to operate the isolator to maintain the single station isolated from the token ring network and within the closed-loop station ring if a communication fault is detected within the closed-loop station ring.

10. The apparatus of claim 8 wherein the detector is configured to detect the transmission of beaconing data, indicating a communication fault within the closed-loop station ring, by the single station.

11. The apparatus of claim 8 wherein the detector includes a sensor coupled to the single station transmit line.

12. The apparatus of claim 11 wherein the detector includes a network management module (NMM) which is coupled to the sensor.

13. The apparatus of claim 8 wherein the detector maintains an indication of the detection or non-detection of the transmission of beaconing data within the closed-loop station ring.

14. The apparatus of claim 8 wherein the detector is configured to detect whether the single station receives at its input data propagated from its output.

15. The apparatus of claim 8 wherein the detector is configured to detect whether a predetermined time period has expired since isolation of the single station from the token ring network in the closed-loop station ring.

16. The apparatus of claim 8 wherein the apparatus comprises a switching system product.

17. The apparatus of claim 8 wherein the apparatus comprises a transmission system product.

18. Apparatus for isolating a communication fault within a token ring network, the apparatus comprising:

means for isolating a single station from a token ring network in a closed-loop station ring and for connecting the single station in a ring topology to the token ring network, wherein the single station is coupled to the token ring network by a station receive line to convey data from the token ring network to the single station and by a station transmit line to convey data from the single station to the token ring network, the means for isolating being configured to isolate the single station so that the station ring includes the station receive and transmit lines and the single station, and no further stations, in a closed loop; and means for detecting a communication fault within the closed-loop station ring when the single station is isolated from the token ring network, and for operating the isolator to connect the single station to the token ring network if a communication fault is not detected within the closed loop station ring.

* * * * *